Patented Feb. 16, 1932

1,845,378

UNITED STATES PATENT OFFICE

HERBERT J. WEST, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF VAT DYES AND INTERMEDIATES

No Drawing. Application filed January 13, 1930. Serial No. 420,630.

This invention relates to the purification of vat dyes of the nitrated perylene type.

The most extensively sold nitrated perylene dye is nitrated dibenzanthrone or as its reduced vat is known in the trade, indanthrene green—B. In the past the shade of this dye has been considerably dulled due to the fact that the dibenzanthrone from which it is prepared by nitration and subsequently reduction is made from benzanthrone by caustic fusion and only about one-half of the crude material is vatable dye, the remaining non-vatable impurities adversely affecting the shade. It has hitherto been proposed to remove these non-vatable impurities before nitration by a filtration process applied to the leuco compound. This process produces a purer dye but the filtration of the impurities presents serious difficulties so that the cost of the process is relatively high although in the past it has been used despite its high cost because of the brighter shades which can be obtained.

The present process is based on the unexpected discovery that the non-vatable impurities after nitration of the crude dibenzanthrone can be so transformed by treatment with a mild alkaline oxidizing agent such as hypochlorite as to be in part readily removable and in part transformed or destroyed so that they do not dull the shade of the dye. At the same time colloidal material appears to be destroyed so that if it is desired to further purify the dye by filtration of the hydrosulfite vat no difficulties are encountered due to slow filtering mixture which have been so serious a drawback to the hydrosulfite filtration of this type of dye. The process of the present invention uses a cheap reagent and necessitates a minimum of manipulation. Not only is a marked increase in brightness of shade obtained but the dyes appear stronger and filtration troubles are practically eliminated.

The oxidizing treatment of the present invention is generally applicable to nitrated perylene dyestuffs with the exception of certain nitrated perylene imides and their N-alkyl or aryl derivatives. These dyes appear to be attacked by alkaline oxidizing agents such as hypochlorites and the process is therefore not applicable to them. Otherwise it is generally applicable to nitrated perylene dyestuffs, for example the blue dye which is obtainable by nitrating isoviolanthrone and similar nitrated perylene dyestuffs irrespective of whether the dye is a ketonic dye or not.

The invention will be described in greater detail in connection with the following specific examples.

Example 1

100 kilograms of nitrated crude violanthrone are thoroughly ground in the cold with 500 liters of a 10% aqueous sodium hypochlorite solution. The mixture is heated gradually until it boils and it is kept boiling for about 10 to 15 minutes. Thereafter the mixture is filtered and the solid material dried. The yield is over 90% of purified dyestuff.

Cotton or regenerated cellulose material dyed with the purified dye when compared with material dyed with the crude nitrated violanthrone before treatment with a hypochlorite shows a greatly increased brightness of shade and the dyeing is noticeably stronger for the same percentage of dye. When the dyed material is treated with a hypochlorite in order to transform the green dye into the black dye of commerce the same difference in brilliancy of shade and strength of dyeing is to be observed. The shade is substantially entirely free from the objectionable brown tone of the black which has been so objectionable in the past.

Example 2

The blue dyestuff prepared by nitrating crude isoviolanthrone is treated with sodium hypochlorite or hypobromite as described in Example 1. The yield of purified blue dyestuff is likewise 90% or better. Cotton or regenerated cellulose material dyed with the purified blue dyestuff shows a remarkable increase in brightness of shade and a noticeable increase in strength of color when compared with material dyed with the unpurified product. After treatment with hypochlorite to transform the blue dye into the black dye a similar difference in brightness of shade and strength of dyeing is observed.

Instead of using hypohalites in the preformed state as described above they may be formed in the nascent state with alkali and halogen and in cases this is a very efficient method. Other mild alkaline oxidizing agents having an oxidizing power comparable to the hypohalites may be used and are effective, though I find that the hypohalities and particularly the hypochlorites, either preformed or in the nascent state, are the most satisfactory for practical commercial use.

What is claimed as new is:

1. A method of purifying a nitrated perylene dyeforming compound which is resistant to hypohalites and which contains non-vatable material, which comprises subjecting the impure nitroperylene compound to the action of a mild alkaline oxidizer.

2. A method according to claim 1, in which the oxidizing agent is an aqueous hypohalite solution.

3. A method according to claim 1, in which the oxidizing agent is an aqueous hypochlorite solution.

4. A method of purifying nitrated ketonic perylene dyeforming materials which are attacked by hypohalites which contain non-vatable impurities which comprises subjecting the nitrated ketonic perylene dyeforming material to the action of a mild alkaline oxidizing agent.

5. A method according to claim 4, in which the oxidizing agent is a hypohalite.

6. A method according to claim 4, in which the oxidizing agent is a hypochlorite.

7. A method of purifying a nitrated dibenzanthrone compound containing non-vatable impurities which comprises subjecting it to the action of a mild alkaline oxidizing agent.

8. A method according to claim 7, in which the oxidizing agent is a hypohalite.

9. A method acording to claim 7, in which the oxidizing agent is a hypochlorite.

10. A method of purifying nitrated violanthrone containing non-vatable impurities which comprises subjecting the nitroviolanthrone to the action of a mild alkaline oxidizing agent.

11. A method according to claim 10, in which the oxidizing agent is a hypohalite.

12. A method according to claim 10, in which the oxidizing agent is a hypochlorite.

13. A method of purifying nitrated violanthrone containing non-vatable impurities which comprises treating it in aqueous suspension with a hypohalite and filtering.

14. A method according to claim 13, in which the hypohalite is a hypochlorite.

15. A method according to claim 13, in which the reaction takes place at about the boiling point of water.

16. A method according to claim 13, in which the oxidizing agent is a hypochlorite and the reaction takes place at about the boiling point of water.

Signed at Pittsburgh, Pennsylvania, this 11th day of January, 1930.

HERBERT J. WEST.